(12) United States Patent
Sexton

(10) Patent No.: US 6,911,256 B2
(45) Date of Patent: Jun. 28, 2005

(54) BUFFER LAYERS FOR MAGNETIC MEDIA WITH A PLASTIC SUBSTRATE

(75) Inventor: Joseph H. Sexton, Oakdale, MN (US)

(73) Assignee: Imation Corp., Oakdale, MN (US)

(*) Notice: Subject to any disclaimer, the term of this patent is extended or adjusted under 35 U.S.C. 154(b) by 0 days.

(21) Appl. No.: 10/609,863

(22) Filed: Jun. 30, 2003

(65) Prior Publication Data

US 2004/0265638 A1 Dec. 30, 2004

(51) Int. Cl.$^7$ .............................. G11B 5/66; G11B 5/70
(52) U.S. Cl. .............................. 428/336; 428/694 TS; 428/694 SL
(58) Field of Search .................... 428/694 TS, 694 TB, 428/694 TM, 336, 694 SL, 900

(56) References Cited

U.S. PATENT DOCUMENTS

| | | | | |
|---|---|---|---|---|
| 5,147,732 A | * | 9/1992 | Shiroishi et al. | 428/668 |
| 2003/0035980 A1 | * | 2/2003 | Igari et al. | 428/694 TS |
| 2003/0064253 A1 | * | 4/2003 | Uwazumi et al. | 428/694 TP |
| 2003/0134151 A1 | * | 7/2003 | Usuki et al. | 428/693 |

FOREIGN PATENT DOCUMENTS

| | | |
|---|---|---|
| JP | 01014715 | 1/1989 |
| JP | 01014716 | 1/1989 |
| JP | 01014717 | 1/1989 |
| JP | 01042022 | 2/1989 |
| JP | 01042023 | 2/1989 |
| JP | 01042024 | 2/1989 |
| JP | 01050227 | 2/1989 |
| JP | 01050228 | 2/1989 |
| JP | 01050229 | 2/1989 |
| JP | 01122030 | 5/1989 |
| JP | 01122031 | 5/1989 |
| JP | 01122032 | 5/1989 |
| JP | 01165019 | 6/1989 |
| JP | 01165020 | 6/1989 |
| JP | 01165021 | 6/1989 |
| JP | 01165022 | 6/1989 |
| JP | 01165023 | 6/1989 |
| JP | 01243222 | 9/1989 |
| JP | 02096917 | 4/1990 |
| JP | 02096918 | 4/1990 |
| JP | 02096919 | 4/1990 |
| JP | 11144232 | 5/1999 |
| JP | 2001176059 | 6/2001 |

* cited by examiner

Primary Examiner—Holly Rickman
(74) Attorney, Agent, or Firm—Eric D. Levinson

(57) ABSTRACT

The invention is directed to magnetic media that make use of plastic substrates. Various buffer layer compositions are described, which can be formed over the plastic substrate. One or more ferromagnetic recording layers are then formed over the buffer layers. The described buffer layers can function as encapsulating layers in order to encapsulate the plastic substrate and provide a barrier between subsequently deposited magnetic layers and the gases within the substrate. Also, the buffer layers can reduce stress in the media either by functioning as a stress reduction layer that promotes growth of the magnetic recording layer in low stress orientations, or by functioning as a stress compensation layer that balances the stress of the subsequently deposited magnetic layers.

7 Claims, 9 Drawing Sheets

BUFFER LAYERS FOR MAGNETIC MEDIA WITH A PLASTIC SUBSTRATE

TECHNICAL FIELD

The invention relates to data storage media and, more particularly, to magnetic media.

BACKGROUND

Many types of magnetic data storage media have been developed to store information. They include magnetic hard drives, magnetic diskettes, magnetic tapes, magnetic tape cartridges, hybrid magnetic media such as magneto-optical disks, and other magnetic media. Increasing data storage density and improving media quality and reliability are paramount goals in the development of new or improved types of magnetic data storage media. Cost reduction is another goal.

Magnetic data storage media generally function according to ferromagnetic or ferrimagnetic principles. For example, the surface of a magnetic recording medium may include a thin ferromagnetic layer, typically included in a thin film stack. The ferromagnetic material can be selectively oriented by a magnet in order to encode data on the surface of the medium. The orientations can then be detected and interpreted in order to read the recorded data.

Magnetic media typically include a substrate and one or more layers of ferromagnetic material deposited over the substrate. The substrate is typically a non-magnetic material that provides a support structure for the magnetic thin film stack. For example, glass and aluminum alloy substrates are commonly used in magnetic hard drives.

Plastic substrates, such as polymer substrates, polymer matrix substrates, polycarbonate substrates, and the like, can provide low-cost substrate alternatives to glass, aluminum, or other conventional substrate materials. However, plastic substrates often cause undesirable effects in the magnetic recording layers coated on the substrate.

SUMMARY

In general, the invention is directed to magnetic media that make use of plastic substrates. Specifically, various buffer layer compositions and combinations that can be formed over the plastic substrate are described. One or more seed layers or ferromagnetic recording layers are formed over the buffer layers. The described buffer layers can function to reduce the stress in the thin film stack and prevent mechanical failure and microcracking of the thin film stack. The described buffer layers can also function as encapsulating layers in order to encapsulate a purged plastic substrate and provide a barrier between the substrate and contaminating atmospheric gases. Subsequently deposited magnetic layers can then be grown free from deleterious contaminants emanating from the substrate.

In one embodiment, the invention provides a data storage medium comprising a plastic substrate, a buffer layer formed over the plastic substrate, the buffer layer consisting essentially of a material selected from tantalum and tungsten, and one or more magnetic layers formed over the buffer layer.

In another embodiment, the invention provides a data storage medium comprising a plastic substrate, a layer consisting essentially of tungsten formed over the plastic substrate, and one or more magnetic layers formed over the layer consisting essentially of tungsten.

In another embodiment, the invention provides a data storage medium comprising a plastic substrate, a buffer layer including tantalum formed over the plastic substrate, and one or more magnetic layers formed over the buffer layer.

In another embodiment, the invention provides a data storage medium comprising a purged plastic substrate substantially purged of atmospheric gases, an encapsulating buffer layer encapsulating the purged plastic substrate, and a magnetic layer formed over the encapsulating buffer layer.

In another embodiment, the invention provides a method comprising substantially purging water, oxygen, and nitrogen from a plastic substrate, substantially encapsulating the plastic substrate with a buffer layer including a material selected from tantalum and tungsten, and forming one or more magnetic layers over the buffer layer.

In another embodiment, the invention provides a data storage medium comprising a plastic substrate and two or more stress-balancing thin film layers formed over the plastic substrate, wherein at least one of the stress-balancing thin film layers consists essentially of a material selected from tantalum and tungsten, and another of the stress-balancing thin film layers consists essentially of a material selected from chromium and titanium. The medium may further include one or more magnetic layers formed over the stress-balancing thin film layers.

The invention may be capable of providing several advantages. For example, the invention can facilitate use of low cost plastic substrates in magnetic media applications. The described buffer layers can provide a barrier to the substrate in order to prevent atmospheric gases from entering a purged substrate. The described buffer layers can also offer low stress adhesion and seeding functionality by using stress compensating layer combinations.

Additional details of these and other embodiments are set forth in the accompanying drawings and the description below. Other features, objects and advantages will become apparent from the description and drawings, and from the claims.

DETAILED DESCRIPTION

The invention is directed to magnetic media that make use of plastic substrates. Specifically, various buffer layer compositions that can be formed over the plastic substrate are described. One or more ferromagnetic recording layers are formed over the buffer layers. The described buffer layers can reduce problems associated with plastic substrates in magnetic media applications, such as by reducing thin film contamination and by reducing thin film stress.

Figure 1:
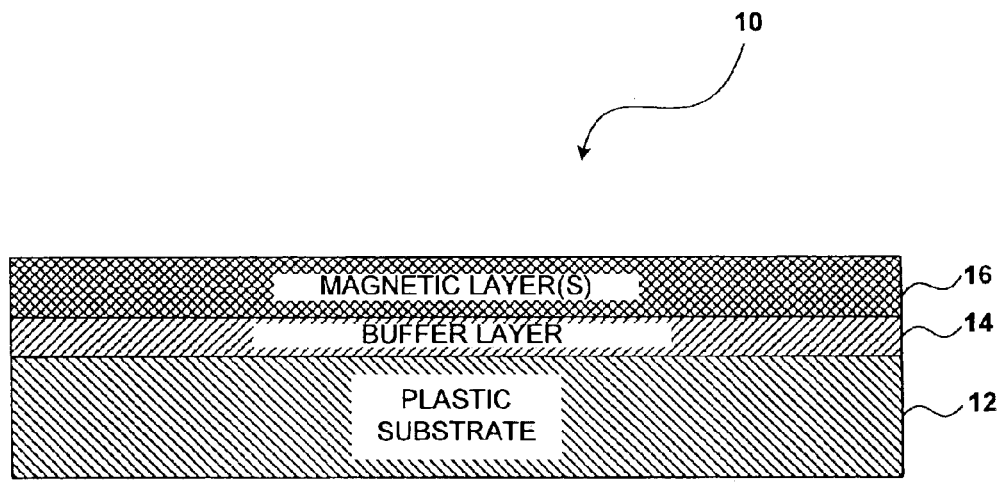
FIG. 1 is a cross-sectional side view of a magnetic medium according to an embodiment of the invention.

FIG. 1 is a cross-sectional side view of a magnetic medium 10 according to an embodiment of the invention. Medium 10 may comprise a magnetic disk, magnetic tape, or the like. As shown in FIG. 1, magnetic medium 10 includes a plastic substrate 12 such as a thermally molded polycarbonate substrate. A buffer layer 14 is formed over plastic substrate 12, and one or more magnetic layers 16 are formed over buffer layer 14. If desired, one or more additional layers, such as seed layers to promote growth of magnetic layers 16, can be provided between buffer layer 14 and magnetic layers 16. Also, a hard coat may by coated over magnetic layers 16. In some cases, buffer layer 14 comprises a multi-layered thin film stack to provide encapsulation and stress compensation as described herein.

Magnetic layers 16, for example, may comprise any ferromagnetic material, ferromagnetic alloy, or ferromagnetic stack useful in magnetic media applications. By way of example and not limitation, materials such as cobalt, cobalt alloys, cobalt-oxide, or the like, may be used to realize magnetic layers 16. In some cases, magnetic layers 16 may comprise a multi-layered magnetic stack, e.g., comprising alternating layers of cobalt and platinum, alternating layers of cobalt and palladium, or the like.

Magnetic layers 16 may define longitudinal or perpendicular magnetic anisotropy. In longitudinal media, magnetic anisotropy of magnetic layers 16 lies parallel to the plane of the medium. In perpendicular media, on the other hand, magnetic anisotropy of magnetic layers 16 is perpendicular to the plane of the medium. Perpendicular media generally allow for a much higher storage density than can be achieved in longitudinal media.

One significant challenge in the production of thin film magnetic media on plastic substrates involves the development of thin film materials and processes which are compatible with the mechanical and thermal properties of the plastic. For example, if a chromium (Cr) seed layer used in magnetic hard disk media was deposited directly on the plastic substrate, the Cr layer would be prone to cracking, on a microscopic level, as a result of high thin film stress and the dimensional instability of the plastic. Also, gases emanating from the substrate during the Cr deposition can result in contamination of the Cr seed layer which could ultimately degrade the subsequently coated magnetic layer or layers.

For this reason, in accordance with the invention; a buffer layer 14 is provided between plastic substrate 12 and magnetic layers 16. Buffer layer 14 may perform a number of functions in medium 10. First, buffer layer 14 can seal out atmospheric gases like oxygen, nitrogen, and water vapor from a substrate, once such gases have been purged from plastic substrate 12. Also, buffer layer 14 can reduce stress in medium 10 by using stress compensated layer combinations which also provide the functionality of adhesion layers and seed layers.

Compositions of buffer layer 14 based on tantalum and tungsten are described in greater detail below, each of which can achieve the goals of providing a gas barrier and low overall stress in medium 10. Chromium and titanium, or chromium and titanium combinations could also form part of buffer layer 14. Buffer layer 14 may define a thickness between approximately 1 and 60 nanometers, and preferably between approximately 2 and 40 nanometers.

In some cases, buffer layer 14 comprises a multi-layered stress-balancing thin film stack. In that case, one layer in the multi-layered stress-balancing thin film stack may consist essentially of tantalum or tungsten, and another layer of the multi-layered thin film stack may consist essentially of chromium or titanium. In other words, medium 10 may comprise plastic substrate 12 and a buffer layer 14 including two or more stress-balancing thin film layers, wherein at least one of the stress-balancing thin film layers consists essentially of a material selected from tantalum and tungsten, and another of the stress-balancing thin film layers consists essentially of a material selected from chromium and titanium. In that case, medium 10 may also include one or more magnetic layers 16 formed over the buffer layer 14, which includes the multiple stress-balancing thin film layers.

Figure 2:
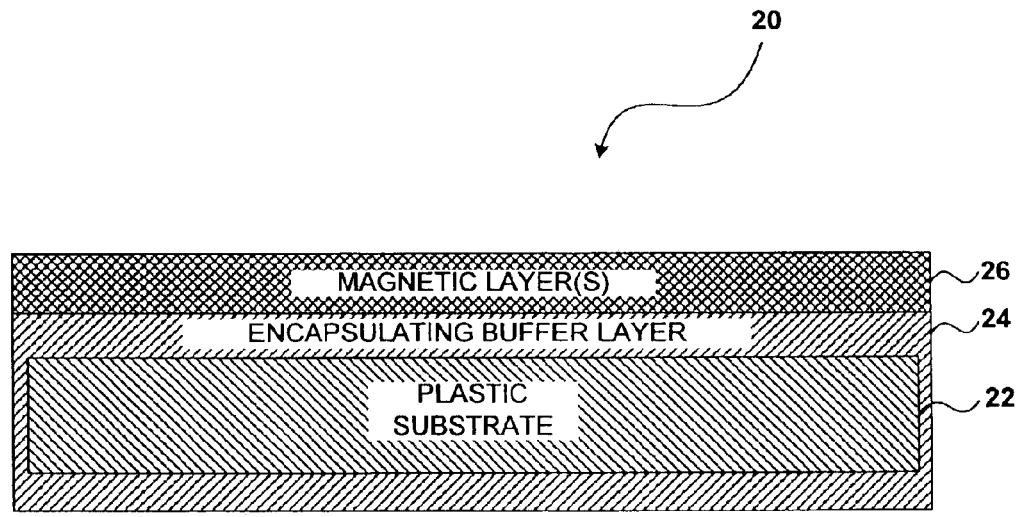
FIG. 2 is a cross-sectional side view of another magnetic medium according to another embodiment of the invention.

FIG. 2 is a cross-sectional side view of another magnetic medium 20 according to an embodiment of the invention. Medium 20 may comprise a magnetic disk, magnetic tape, or the like. Magnetic medium 20 is very similar to medium 10 (FIG. 1) and includes a plastic substrate 22 such as a thermally molded polycarbonate material, a buffer layer 24 formed over plastic substrate 22, and one or more magnetic layers 26 formed over buffer layer 24. In the example of FIG. 2, however, buffer layer 24 largely or completely encapsulates plastic substrate 22 on all sides of substrate 22. In other words, encapsulating buffer layer 24 largely or completely surrounds all sides of plastic substrate 22. Encapsulating buffer layer 24 may define a thickness between approximately 1 and 40 nanometers, and preferably between approximately 2.5 and 20 nanometers. Like in medium 10, in medium 20, buffer layer 24 may comprise a multi-layered thin film stack to provide encapsulation and stress compensation as described herein.

The material compositions of various buffer layers described herein may be formed similar to buffer layer 14 illustrated in FIG. 1, or formed similar to encapsulating buffer layer 24 illustrated in FIG. 2. For simplicity, FIGS. 3 and 4 illustrate configurations similar to that of FIG. 1, although the same buffer materials described with reference to FIGS. 3 and 4 could alternatively be formed on all sides to completely or substantially encapsulate the respective substrate in a manner similar to the embodiment illustrated in FIG. 2.

Figure 3:
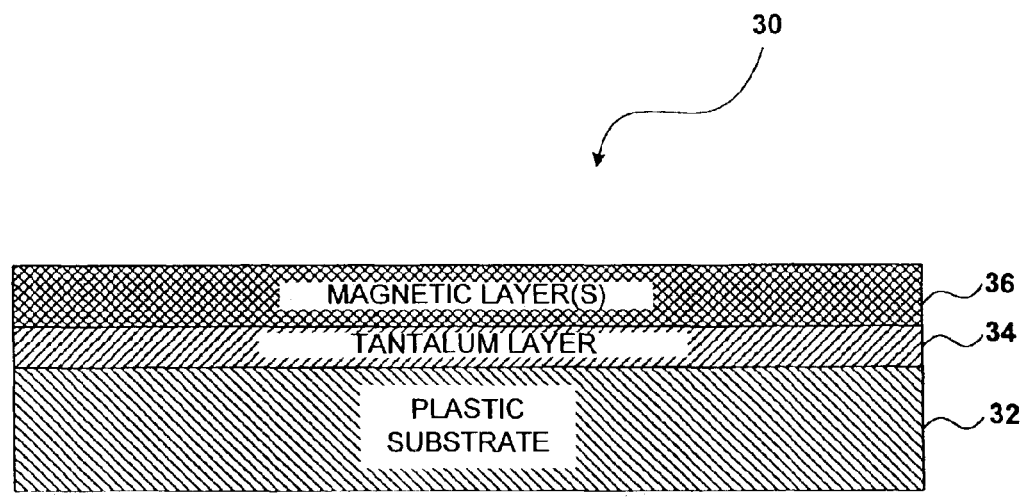
FIGS. 3 and 4 are cross-sectional side views of magnetic media according to additional embodiments of the invention.

FIG. 3 is a cross-sectional side view of another magnetic medium 30 according to an embodiment of the invention. Medium 30 may comprise a magnetic disk, magnetic tape, or the like. As shown in FIG. 3, medium 30 includes a plastic substrate 32, a buffer layer of tantalum 34 formed over plastic substrate 32 and one or more magnetic layers 36 formed over tantalum layer 34. Tantalum layer 34 acts as a gas barrier between plastic substrate 32 and magnetic layers 36. In addition, tantalum layer 34 acts as a stress compensation layer that compensates for the stress in magnetic layers 36. In other words, the stress in tantalum layer 34 counteracts and balances the stress in other underlayers (not shown), seed layers (not shown), or magnetic layers 36 such that the overall stress in medium 30 is reduced. For example, sputtered tantalum thin films can be grown with compressive stress. Tantalum layer 34 may include tantalum, and in some cases, consists essentially of tantalum.

By adjusting the thickness and deposition parameters of a tantalum buffer layer, the compressive stress can be made to reduce or largely eliminate the net stress in a thin film stack containing layers with tensile stress such as chromium or chromium alloys commonly used in thin film magnetic recording stacks. Accordingly, use of tantalum layer 34 as a buffer layer between plastic substrate 32 and magnetic layers 36 can improve medium 30 relative to some conventional media. Tantalum layer 34 defines a thickness between approximately 1 and 40 nanometers, and preferably between approximately 2.5 and 20 nanometers.

Figure 4:
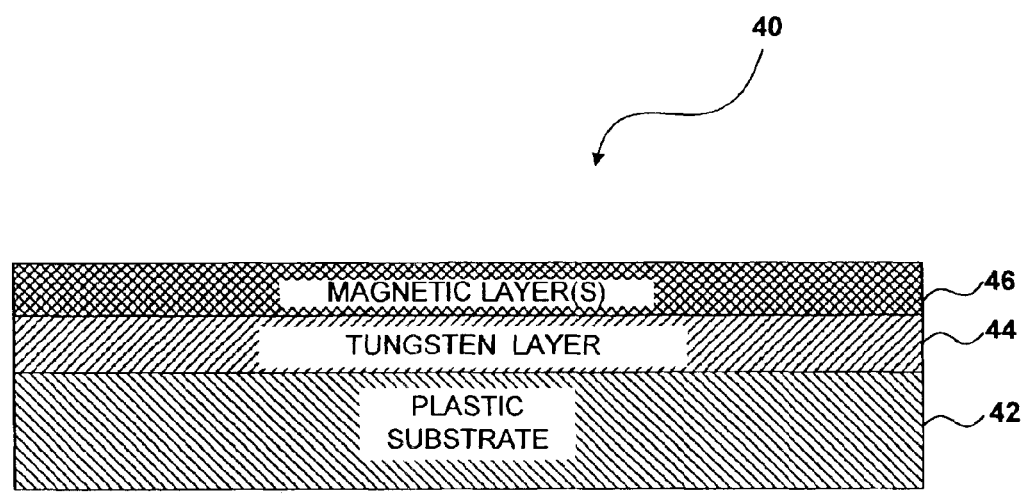

FIG. 4 is a cross-sectional side view of another magnetic medium 40 according to an embodiment of the invention. Medium 40 may comprise a magnetic disk, magnetic tape, or the like. As shown in FIG. 4, medium 40 includes a plastic substrate 42, a buffer layer of tungsten 44 formed over plastic substrate 42 and one or more magnetic layers 46 formed over tungsten layer 44. Tungsten layer 44 acts as a gas barrier between plastic substrate 42 and magnetic layers 46. In addition, tungsten layer 44 acts as a stress compensation layer that compensates for the stress in magnetic layers 46. In other words, the stress in tungsten layer 44 counteracts and balances the stress in magnetic layers 46, or other layers (not shown) in medium 40 such that the overall stress in medium 40 is reduced. Tungsten layer 44 may include tungsten, and in some cases, consists essentially of tungsten.

Like tantalum discussed above, tungsten thin films can be grown with compressive stress. By adjusting the thickness and deposition parameters of a tungsten buffer layer, the compressive stress of a tungsten layer can also be made to reduce or largely eliminate the net stress in a thin film stack containing layers with tensile stress such chromium or chromium alloys commonly used in thin film magnetic recording stacks. Accordingly, use of tungsten layer 44 as a buffer layer between plastic substrate 42 and magnetic layers 46 can improve medium 40 relative to some conventional media. Tungsten layer 44 defines a thickness between approximately 1 and 40 nanometers, and preferably between approximately 2.5 and 20 nanometers.

Figure 5:
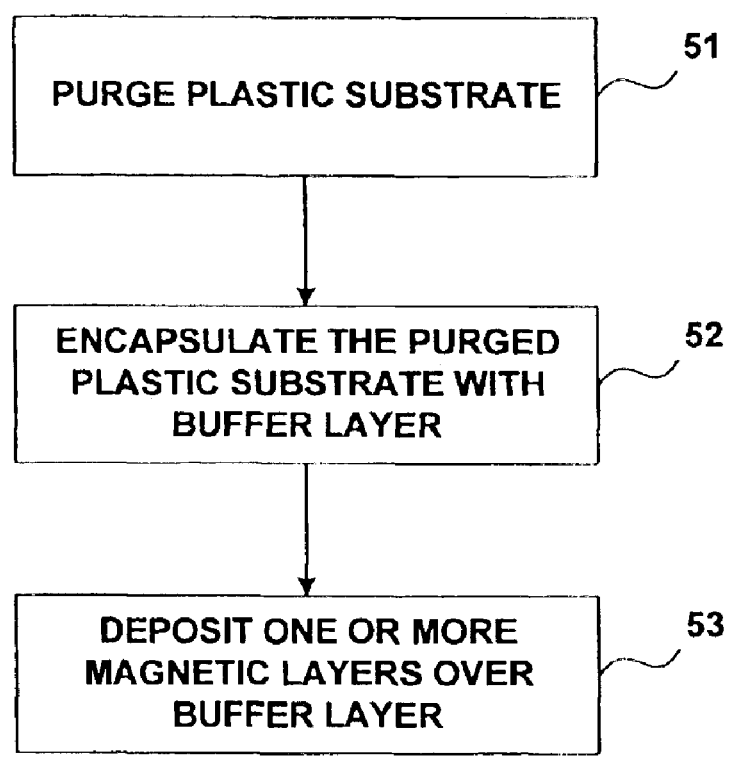
FIG. 5 is a flow diagram illustrating a process for creating media according to an embodiment of the invention.

FIG. 5 is a flow diagram illustrating a process for creating media, such as that described herein, that can further improve the media. FIG. 5 will be described with reference to FIG. 2, and the encapsulating buffer layer 24 of medium 20 in FIG. 2 may consist essentially of tantalum or tungsten.

As shown in FIG. 5, plastic substrate 22 is substantially purged of gases which have deleterious effects on thin film properties, e.g., in a purging chamber (51). Purging may include heating the substrate to a high but mechanically tolerable temperature in an atmosphere consisting of argon gas, or substantially consisting of argon gas. The argon gas displaces the oxygen, nitrogen, and water vapor in the plastic substrate after several minutes. The purged plastic substrate 22 is then transported to sputter deposition system and encapsulated by buffer layer 24 (52). The purged and encapsulated substrate can then be submitted to a thin film deposition process where very low water, oxygen, and nitrogen partial pressures, e.g. less than 10 E–8 Torr, are important throughout the entire thin film deposition process. Encapsulating plastic substrate 22 may comprise encapsulating the plastic substrate in its entirety, or substantially encapsulating the plastic substrate. For example, if the media being substantially encapsulated comprises magnetic tape, ends of the tape strands may remain non-encapsulated. Also, if the substrate is a disk, the inner diameter (ID) region or the outer diameter (OD) edge may remain non-encapsulated due to shadowing of the substrate mounting fixtures.

Buffer layer 24, for example, may be deposited on all sides of plastic substrate 22 to define a thickness between approximately 1 and 40 nanometers, and preferably between approximately 2.5 and 20 nanometers. One or more magnetic layers 26 are then deposited over buffer layer 24 to define medium 20 (53). Seed layers, or the like, may also be used to improve growth of the magnetic layers 26. Also, a hard coat may be added. In any case, in accordance with the invention, substantially purging plastic substrate 22 prior to encapsulation with buffer layer 24 can further improve medium 20 by reducing the chance that contaminating gas can escape from plastic substrate 22 to contaminate magnetic layers 26.

Figure 6:
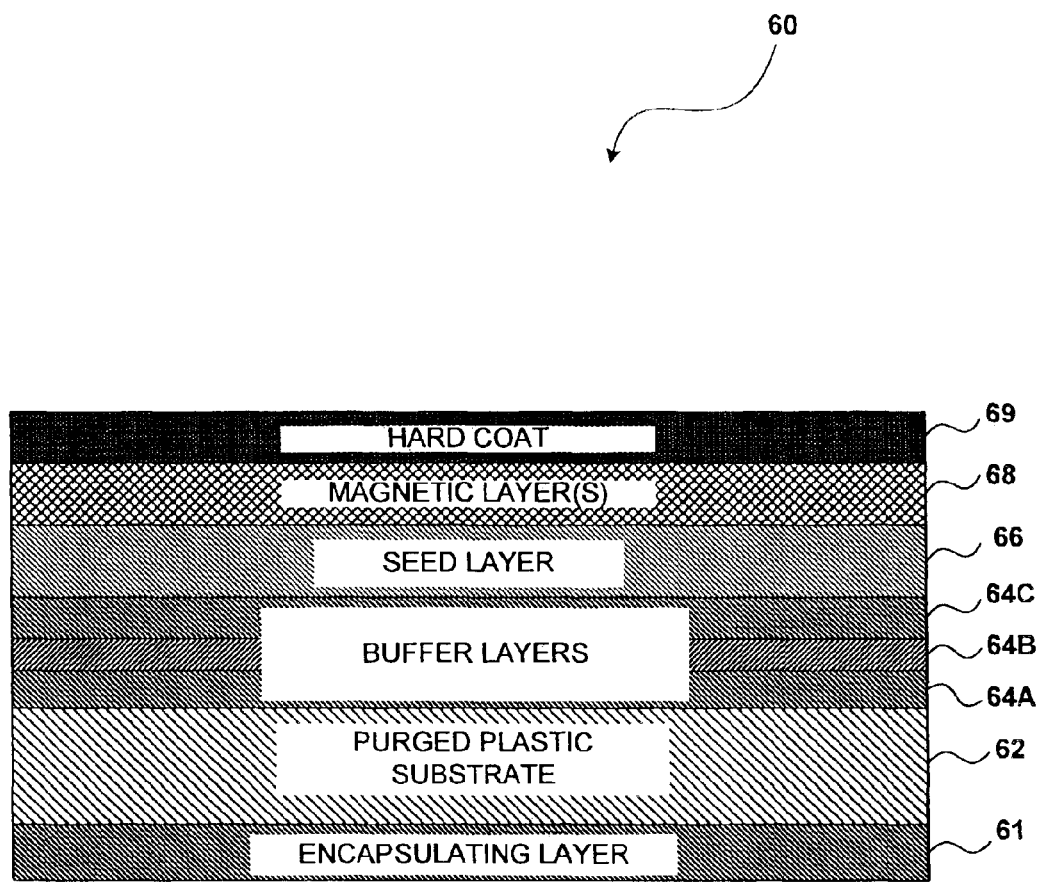
FIG. 6 is a cross-sectional side view of another magnetic medium according to another embodiment of the invention.

FIG. 6 is a cross-sectional side view of another magnetic medium 60 according to an embodiment of the invention. Medium 60 may comprise a magnetic disk, magnetic tape, or the like. As shown in FIG. 6, medium 60 includes a purged plastic substrate 62, an encapsulating layer 61 formed on one side of substrate 62, and a set of buffer layers 64A–64C (collectively buffer layers 64) formed on the other side of substrate 62. For example, substrate 62 may be purged or de-gassed as described herein, and then substantially encapsulated. For example, layer 64A may comprise an encapsulating layer similar to layer 61 such that purged plastic substrate 62 is substantially encapsulated. Seed layer 66 can be formed over buffer layers 64. One or more magnetic layers 68 can be formed over seed layer 66, and hard coat layer 69 can be formed over magnetic layers 68.

In one example, plastic substrate 62 comprises a purged polycarbonate material. Encapsulating layer 61 and buffer layer 64A comprise layers of chromium (Cr). Buffer layer 64B comprises a layer of tantalum (Ta). Buffer layer 64C comprises another layer of chromium (Cr). Seed layer 66 comprises a chromium or a chromium alloy such as chromium-vanadium (CrV). Magnetic layer 68 comprises a cobalt alloy (Co alloy) layer, and hard coat 69 comprises a carbon (C) layer. Additional details of such a medium are discussed in example 5, below.

Figure 7:
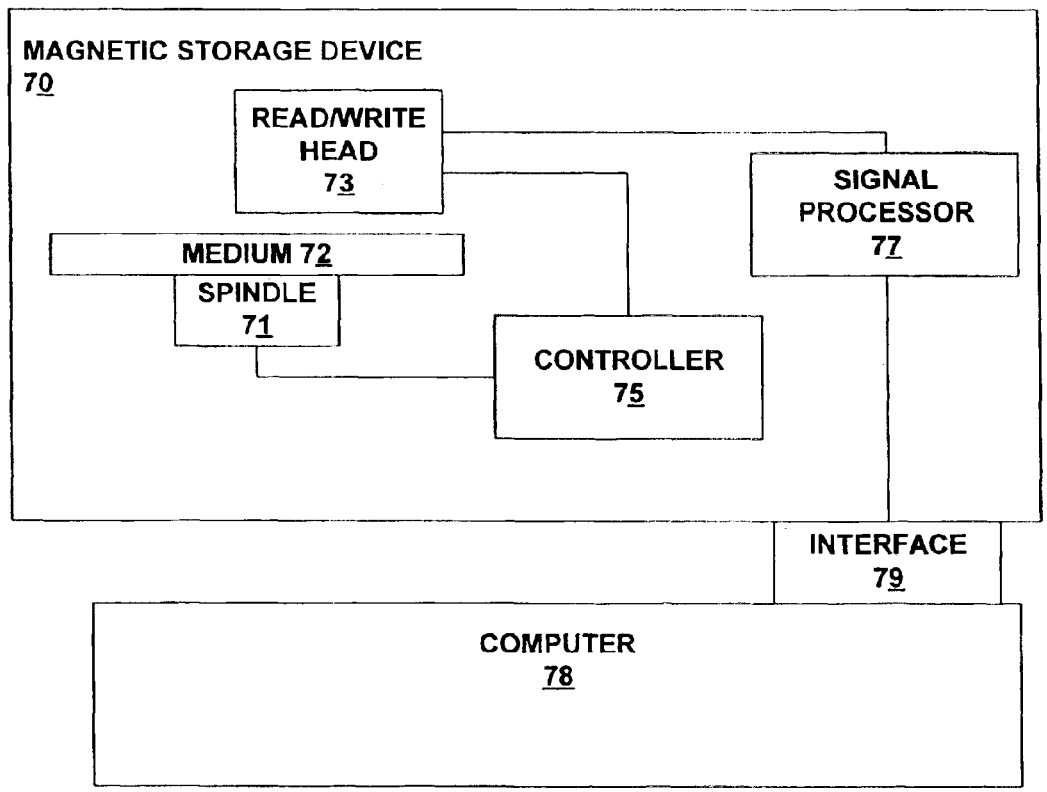
FIGS. 7 and 8 are block diagrams of exemplary magnetic storage devices that may be used to read or record data on media described herein.
Figure 8:
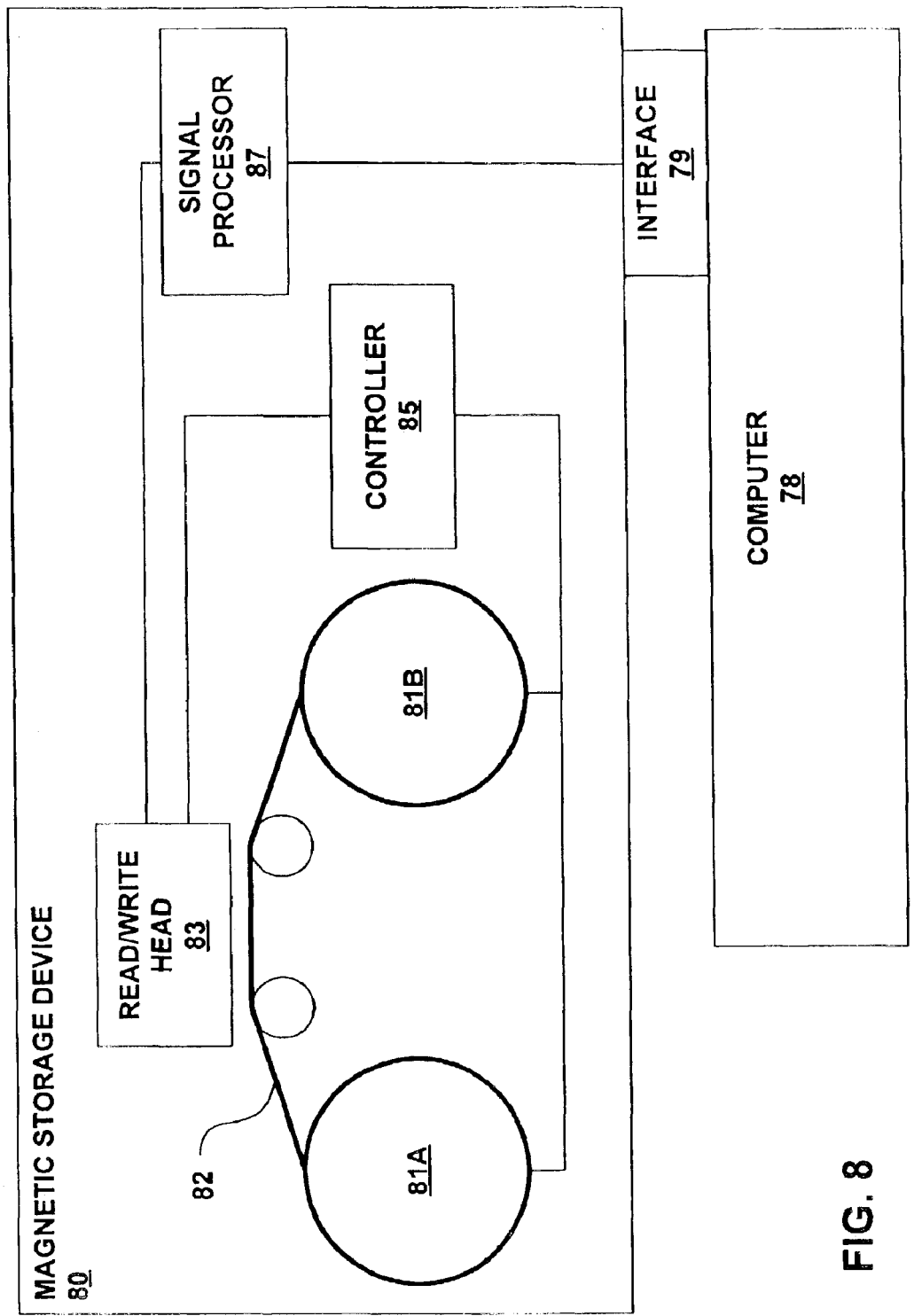

FIGS. 7 and 8 are block diagrams of exemplary magnetic storage devices that may be used to read or record data on media described herein. As shown in FIG. 7, magnetic storage device 70 is used with a disk shaped medium 72, which may correspond to any of media described herein. Magnetic storage device 70 may comprise a magnetic disk drive, a hard disk drive, a floppy disk drive, or the like. Spindle 71 spins medium 72 and read/write head 73 is positioned to detect magnetic domains on medium 72. A controller 75 controls spindle 71 and read/write head 73 to precisely position read write head 73 relative to medium 72. A signal processor 77 interprets detected magnetic domains.

As further illustrated in FIG. 7, magnetic storage device 70 can be coupled to a computer 78 via an interface 79. For example, computer 78 may comprise a central processing unit for any of a variety of computer devices, including, for example, a PC, a Macintosh, a computer workstation, a hand-held data terminal, a cell phone, digital paper, a digital television, a wireless device (in which case interface 79 may be wireless), a personal digital assistant, a laptop computer, a desktop computer, a digital camera, a digital recording device, or the like.

As shown in FIG. 8, magnetic storage device 80 is used with a medium 82 in the form of magnetic tape. Medium 82 may correspond to any of the media described herein. Magnetic storage device 80 comprises a magnetic tape drive, a magnetic tape cartridge drive, or the like. Medium 82 comprises magnetic tape spooled onto one or more spools 81A and 81B. Spools 81 may be housed in a cartridge, although the invention is not limited in that respect. Read/write head 83 is positioned to detect magnetic domains on medium 82. A controller 85 controls the positioning of read/write head 83 as well as the movement of medium 82 such as by turning spools 81A and/or 81B to precisely position read write head 83 relative to medium 82. A signal processor 87 interprets detected magnetic domains. Like in FIG. 7, magnetic storage device 80 of FIG. 8 may be coupled to a computer 78 via an interface 79.

EXAMPLES

The thin films of the following examples were coated in a high vacuum sputtering system equipped with a planetary. The base pressure of the system was between 2 E–9 Torr and 5 E–9 Torr. With plastic sample substrates in the system, the pressure was generally between 2 E–8 Torr and 8 E–8 Torr. During thin film deposition the planetary was made to revolve about its major axis, passing the substrate opposite the sputter sources in the system in a repetitive fashion to create thin film coatings of uniform thickness. All layer thicknesses were controlled by timing the exposure of the sample substrate to sputter sources operated at pre-calibrated operating conditions. Also, the depositions were performed near room temperature, i.e., at approximately 24 degrees Celsius, with no active heating during the depositions. The sputter sources used in these examples were DC magnetrons. The sources in the system included tantalum (Ta), chromium (Cr), vanadium (V), cobalt (Co), platinum (Pt) and carbon (C) sources. The Cr, Co, and C sputter sources were 6 inches (15.24 cm) in diameter. The Ta, V, and Pt sources were 3 inches (7.62 cm) in diameter. The distance from the front of a sputter source cathode to a substrate directly opposite the source was approximately 10 cm. Ar was used as the sputtering gas in all of the examples.

Example 1

A 120 mm diameter polycarbonate disk substrate was mounted onto the planetary sample platten. The system was pumped to a base pressure of 3.8 E–8 Torr. The substrate was then set in motion on the planetary with a major axis speed of 0.8 rev/sec and a minor axis speed of 6.7 rev/sec. 400 angstrom (Å) of CrV20 was deposited onto the polycarbonate substrate by operating the Cr source power at 185 W and the V source at 100 W while the substrate passed repetitively over the two sources. Less than 1 Å of Cr and V was deposited per pass to ensure a uniform composition distribution through the thickness of the film. The Ar sputtering pressure was 6 mT. Finally, a 100 Å carbon nitride protective layer was deposited at a major axis speed of 0.4 rev/sec and a minor axis speed of 3.2 rev/sec, with the C source operated at 500 W at an Ar+N2 pressure of 2 mT.

A photomicrograph of the created sample was then obtained using transmitted light. The transmitted light photomicrograph showed uniformly distributed stress-induced microcracking over the entire film surface. The stress which caused this microcracking originated from the highly tensile CrV20 alloy. Similar deleterious effects can be observed with many sputtered Cr-rich compositions deposited onto plastic substrates.

Example 2

Three stress measurement samples were prepared with the general construction of: [0.5 mil polyimide substrate]/[20 Å Cr adhesion-promoting layer]/[Ta layer]/[100 Å Cr underlayer]/[500 Å CrV20 magnetic seed layer]. Three Ta layer thicknesses were used: 0, 200, and 400 Å. The polyimide substrates were approximately 3 in$^2$ in area, 0.5 mil in thickness, and essentially flat before coating.

The 20 Å Cr adhesion-promoting layer of each sample was formed at a planetary major axis speed of 0.8 rev/sec and a minor axis speed of 6.7 rev/sec while operating the Cr source at a fixed voltage of 600 V with an Ar pressure of 0.22 mT. The Ta layers were coated at a planetary major axis speed of 0.4 rev/sec and a minor axis speed of 3.2 rev/sec while operating the Ta source at a power of 100 W with an Ar pressure of 1.0 mT. The 100 Å Cr underlayer was coated using the same sputtering conditions as the Cr adhesion promoting layer. The 500 Å CrV20 seed layer was coated using the same conditions as in Example 1.

A one square inch coupon was cut from each of the three samples and the radius of curvature of the curl in each coupon was measured using a caliper. The measured radii were used to calculate an effective stress value for the thin film stack on each coupon using Stoney's equation:

$$\sigma_f = (E_s t_s^2)/(1-\nu_s)6Rt_f,$$

where $\sigma_f$ is the thin film stress, $t_s$ is substrate thickness, $\nu_s$ is the Poisson ratio, R is the radius of curvature of the sample due to the thin film stress, $t_f$ is the film thickness, and $E_s$ is the elastic modulus of the substrate material.

Figure 9:
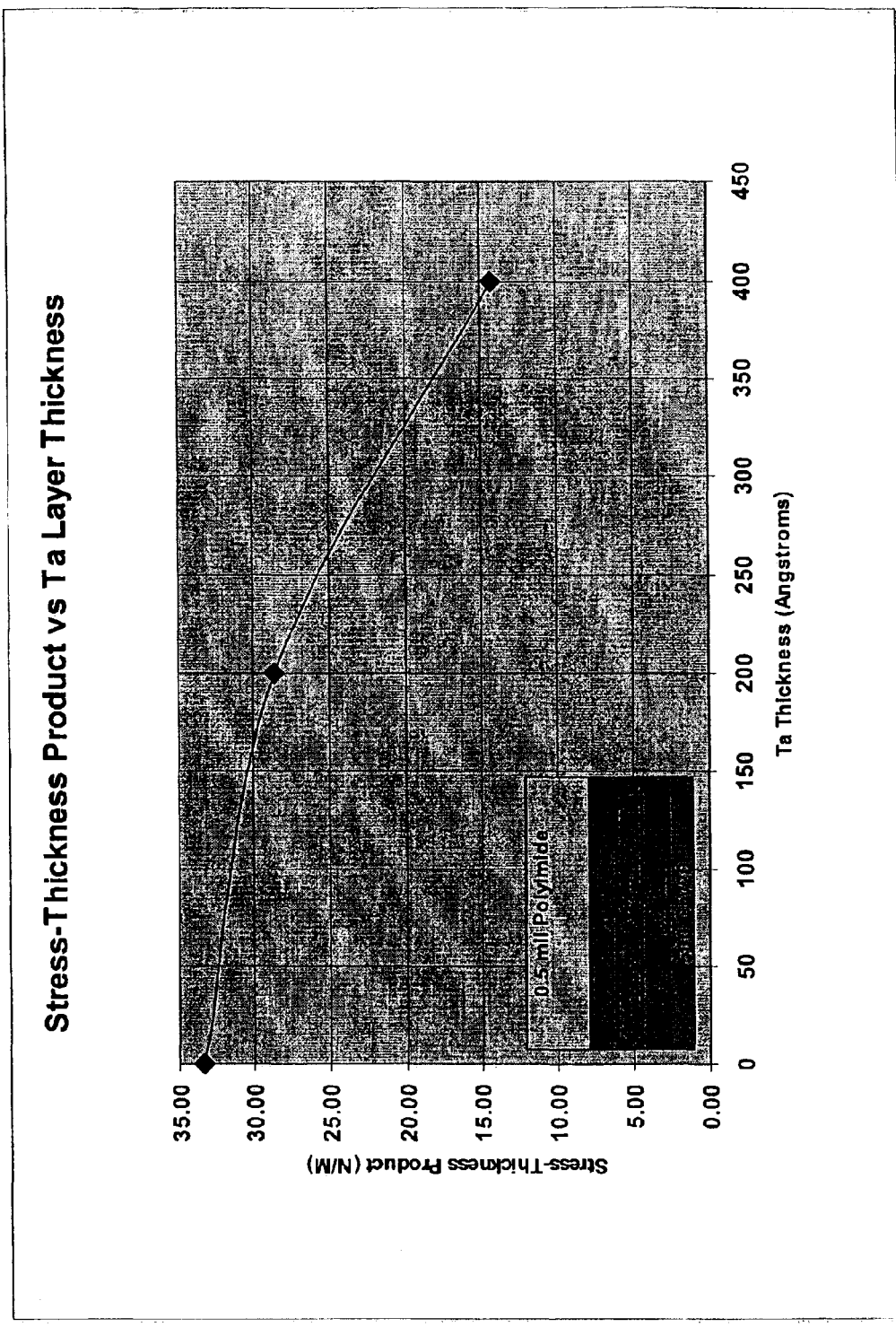
FIGS. 9 and 10 are graphs illustrating qualities of various media according to embodiments of the invention.

The elastic modulus ($E_s$) of the polyimide was approximately $2.5 \times 10^9$ Pa, and the Poisson ratio of the polyimide was 0.34. These results were used to plot the stress-thickness product as a function of Ta thickness in FIG. 9. The total thin film stack thickness is used in the stress-thickness product. The positive stress values in FIG. 9 indicate that the net stress in the thin films stacks is tensile, and the trend of FIG. 9 indicates that the tensile net stress in the thin film stack decreases with increasing Ta layer thickness. This result indicates that the compressive stress of the sputtered Ta is working to balance the large tensile stress of the Cr and the Cr alloy layers.

Example 3

Four stress measurement samples were prepared with the general construction of: [0.5 mil polyimide substrate]/[Cr adhesion-promoting layer]/[400 Å Ta layer]. Four Cr adhesion-promoting layer thicknesses were used: 0, 5, 20, and 100 Å. The polyimide substrates were approximately 3 in$^2$ in area, 0.5 mil in thickness, and essentially flat before coating, and the Cr and Ta layers of each sample thin film stack were coated under the same conditions as described in Example 2.

Figure 10:
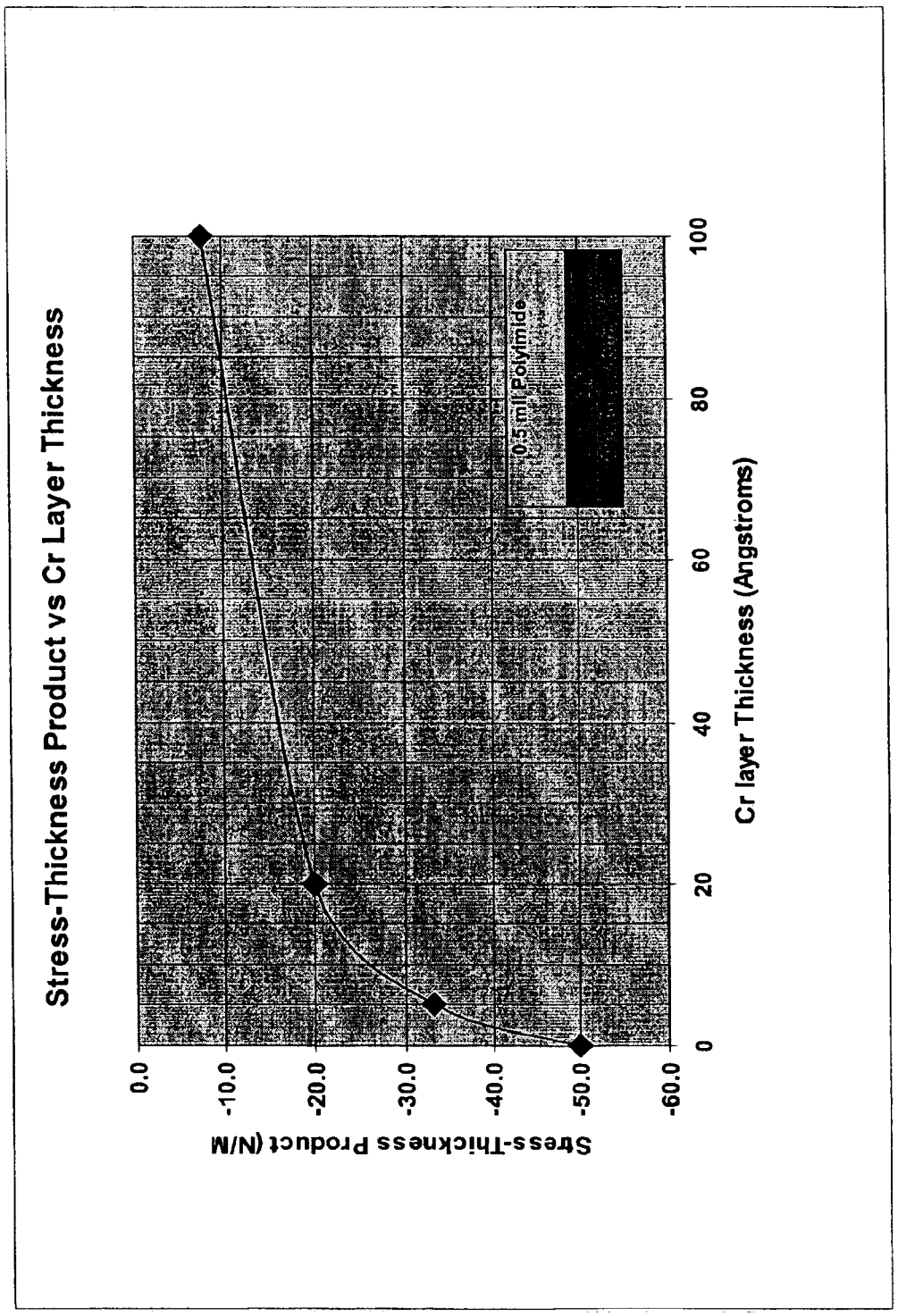

The total thin-film stress of each sample was determined using the same method as in Example 2 and the stress-thickness product is plotted as a function of Cr thickness in FIG. 10. Again the stress-thickness product uses the total film stack thickness. The negative stress-thickness values in FIG. 10 indicate compressive stress and the trend of FIG. 10 indicates that the compressive net stress in the thin film stack decreases with increasing Cr thickness. The main conclusion from this result is that the tensile stress of the sputtered Cr is working to balance the compressive stress of the Ta. Also, the results show a strong non-linear dependence on Cr adhesion layer thickness, suggesting a strong interface effect is playing a role since the change in total stress changes so rapidly with very small thicknesses of Cr. This indicates that very thin layers of Cr are effective in producing large tensile stress when coated directly onto plastic.

Example 4

Three stress-measurement samples were prepared having the following constructions:

Sample A: [0.5 mil polyimide substrate]/[100 Å Cr]/[400 Å CrV20];

Sample B: [0.5 mil polyimide substrate]/[400 Å Ta]/[100 Å Cr]/[400 Å CrV20]; and Sample C: [0.5 mil polyimide substrate]/[400 Å Ta].

The polyimide substrates were approximately 3 in$^2$ in area, were approximately 0.5 mil in thickness, and were essentially flat before coating. The Cr, CrV20, and Ta layers of each sample thin film stack were coated under the same conditions as described in Example 2. The total thin film stress of each sample were also determined using the same method as in Example 2 and the resulting stress-thickness product values are shown in the following Table 1.

TABLE 1

| Sample | Stress-Thickness Product |
|---|---|
| A | 33 N/M |
| B | 0 N/M |
| C | −50 N/M |

The results indicate that the net stress of a Ta/Cr thin film stack can be eliminated by balancing the compressive stress of sputtered Ta with the tensile stress of the Cr and/or Cr alloy layers.

Example 5

A high vacuum sputtering system having a base pressure of between 2 E−9 Torr and 5 E−9 Torr was loaded with a polycarbonate disk substrate having a 15 mm inner diameter and a 120 mm outer diameter. After loading the polycarbonate substrate into the high vacuum sputtering system, the pressure in the system rose to approximately 2.5 E−8 Torr. A residual gas analyzer (Inficon IQ200) measurement showed that most of the pressure rise was due to water vapor and nitrogen emanating from the polycarbonate substrate. The back side of the polycarbonate substrate was coated with 200 Å of Cr, and the disk was then turned over and the front side of the disk was sputter coated with 7 Å of Cr, followed by a coating of 300 Å of Ta, and finally a coating of 100 Å of Cr. All of the Cr and Ta layers were coated under the same conditions as in Example 2. A 1.5" diameter mounting fixture at the center of the disk kept the ID area of the substrate free from coating.

The disk was then removed from the sputter system and heated to 80 C. in an argon atmosphere to substantially reduce the amount of water vapor, nitrogen, and oxygen in the substrate and replace it with argon. The disk was then loaded into the high vacuum sputtering system. The partial pressure of water vapor, nitrogen, and oxygen in the high vacuum sputtering system containing the disk was now measured to be less than 2.9 E−9 Torr. At this point, a 400 Å layer of CrV20 was sputter coated onto the front side of the disk, followed by sputter coating a 100 Å layer of a Co-based alloy with longitudinal anisotropy, and finally a 55 Å carbon-based hardcoat layer was sputter coated. The constructed medium was similar to medium 60 of FIG. 6.

Figure 11:
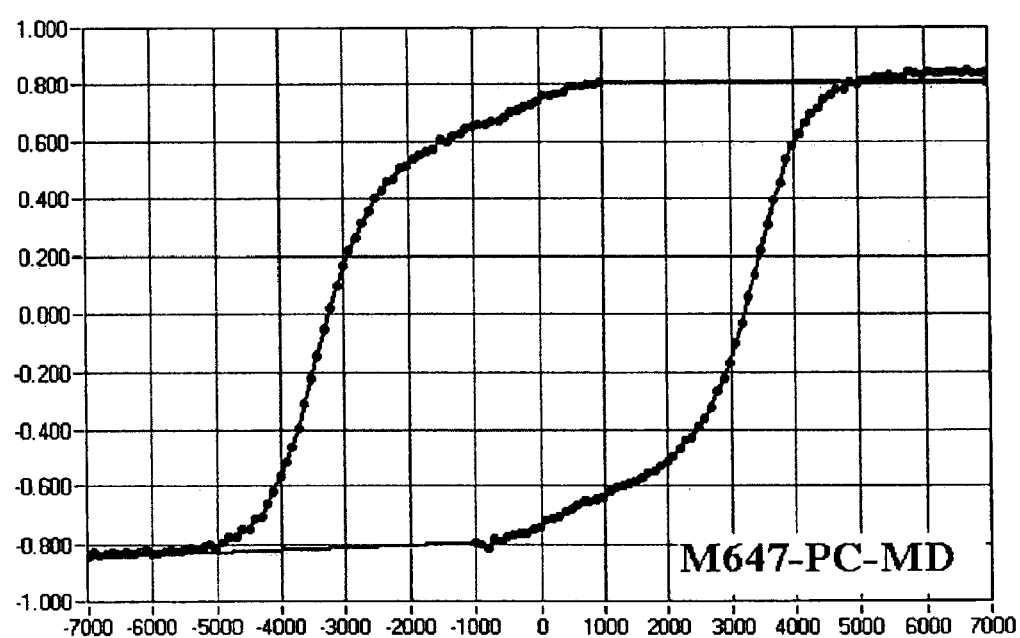
FIG. 11 is a hysteresis curve illustrating qualities of media according to an embodiment of the invention.

The sample was then removed from the high vacuum sputtering system and inspected via optical microscopy, where it was found that no stress-induced microcracking of the thin films occurred. The sample was then heated to 80 C. and cooled to 23 C., and reinspected via optical microscopy and still no stress-induced microcracking of the thin films occurred. A vibrating sample magnetometer (VSM) was used to measure the magnetization of the sample vs. applied field, i.e., the magnetic hysterisis loop. The coercivity (Hc) of the sample was 3393 Oe, the remanence (S) was 0.88, and squareness (S*) was 0.72, as shown in FIG. 11. Further, the sample was lubed and tested for magnetic record performance on a Guzik magnetic disk tester where it was able to reliably support a magnetic flying head without consequences from deleterious, stress-induced mechanical effects. Coercivities greater than 3000 Oe, such as that achieved in this example, can ensure high density storage capability and medium stability.

A number of embodiments of the invention have been described. In particular, materials useful in buffer layers of magnetic media formed on plastic substrates have been described. The described buffer layers can provide a barrier between subsequently deposited magnetic layers and the gases within the substrate. In some cases, purging of the substrate gases is also performed, and the substrate is encapsulated by the buffer layer.

Also, the described buffer layers can reduce stress in the media either by functioning as a stress reduction layer that promotes growth of the magnetic recording layer in low stress orientations, or by functioning as a stress compensation layer that balances the stress of the subsequently deposited magnetic layers. These and other embodiments are within the scope of the following claims.

What is claimed is:

1. A data storage medium comprising:
    a plastic substrate;
    a buffer layer formed over the plastic substrate, the buffer layer consisting essentially of a material selected from tantalum and tungsten, wherein the buffer layer defines a thickness between approximately 1 and 40 nanometers;
    one or more magnetic layers formed over the buffer layer; and
    a seed layer formed between the buffer layer and the one or more magnetic layers, wherein the seed layer consists essentially of a material selected from the group consisting of chromium and a chromium alloy, wherein thicknesses of the buffer layer and the seed layer are defined such that stress in the medium is substantially balanced.

2. The data storage medium of claim 1, wherein the buffer layer substantially encapsulates the plastic substrate.

3. The data storage medium of claim 1, wherein the buffer layer consists essentially of tungsten.

4. The data storage medium of claim 1, wherein the buffer layer consists essentially of tantalum.

5. The data storage medium of claim 1, further comprising a plurality of magnetic layers formed over the buffer layer.

6. The data storage medium of claim 1, wherein the buffer layer defines a thickness between approximately 2.5 and 20 nanometers.

7. The data storage medium of claim 1, wherein the plastic substrate is substantially purged of atmospheric gases and the buffer layer substantially encapsulates the plastic substrate.

* * * * *